US008291694B2

(12) United States Patent
Gonze et al.

(10) Patent No.: US 8,291,694 B2
(45) Date of Patent: Oct. 23, 2012

(54) ELECTRICALLY HEATED PARTICULATE FILTER ENHANCED IGNITION STRATEGY

(75) Inventors: Eugene V. Gonze, Pinckney, MI (US); Michael J. Paratore, Jr., Howell, MI (US)

(73) Assignee: GM Global Technology Operations LLC

( * ) Notice: Subject to any disclaimer, the term of this patent is extended or adjusted under 35 U.S.C. 154(b) by 1218 days.

(21) Appl. No.: 11/950,576

(22) Filed: Dec. 5, 2007

(65) Prior Publication Data

US 2011/0214414 A1 Sep. 8, 2011

Related U.S. Application Data

(60) Provisional application No. 60/934,985, filed on Jun. 15, 2007.

(51) Int. Cl.
*F01N 3/027* (2006.01)
(52) U.S. Cl. .......................... 60/286; 60/297
(58) Field of Classification Search .............. 60/286, 60/295, 297, 303, 311
See application file for complete search history.

(56) References Cited

U.S. PATENT DOCUMENTS

| 4,505,726 A | 3/1985 | Takeuchi et al. |
| 4,516,993 A | 5/1985 | Takeuchi et al. |
| 4,548,625 A * | 10/1985 | Ishida et al. ............... 55/282 |
| 4,872,889 A * | 10/1989 | Lepperhoff et al. ........ 55/282.3 |
| 5,458,673 A | 10/1995 | Kojima et al. |
| 5,480,621 A | 1/1996 | Breuer et al. |
| 5,904,902 A * | 5/1999 | Matuoka et al. ............ 422/174 |
| 6,240,624 B1 * | 6/2001 | Hironaka ..................... 29/611 |
| 2004/0223892 A1 * | 11/2004 | Kojima ........................ 422/177 |
| 2004/0226287 A1 * | 11/2004 | Edgar et al. ................. 60/295 |
| 2006/0144038 A1 * | 7/2006 | Miura ........................... 60/286 |
| 2007/0044460 A1 | 3/2007 | Gonze et al. |
| 2008/0264045 A1 * | 10/2008 | Hara et al. ................... 60/295 |

FOREIGN PATENT DOCUMENTS

| CN | 1920267 A | 2/2007 |
| DE | 10048511 A1 | 4/2002 |
| DE | 60304322 T2 | 12/2006 |
| DE | 102006044503 A1 | 4/2007 |
| WO | WO 2006092946 A1 * | 9/2006 |

OTHER PUBLICATIONS

Office Action dated Apr. 21, 2010 from the German Patent Office Application No. 10 2008 028 005.4; 4 pages.

\* cited by examiner

*Primary Examiner* — Thomas Denion
*Assistant Examiner* — Jonathan Matthias

(57) ABSTRACT

An exhaust system that processes exhaust generated by an engine is provided. The system generally includes a particulate filter (PF) that filters particulates from the exhaust wherein an upstream end of the PF receives exhaust from the engine. A grid of electrically resistive material is applied to an exterior upstream surface of the PF and selectively heats exhaust passing through the grid to initiate combustion of particulates within the PF. A catalyst coating applied to at least one of the PF and the grid. A control module estimates a temperature of the grid and controls the engine to produce a desired exhaust product to increase the temperature of the grid.

18 Claims, 7 Drawing Sheets

ELECTRICALLY HEATED PARTICULATE FILTER ENHANCED IGNITION STRATEGY

CROSS-REFERENCE TO RELATED APPLICATIONS

This application claims the benefit of U.S. Provisional Application No. 60/934,985, filed on Jun. 15, 2007. The disclosure of the above application is incorporated herein by reference.

STATEMENT OF GOVERNMENT RIGHTS

This invention was produced pursuant to U.S. Government Contract No. DE-FC-04-03 AL67635 with the Department of Energy (DoE). The U.S. Government has certain rights in this invention.

FIELD

The present disclosure relates to methods and systems for heating particulate filters.

BACKGROUND

The statements in this section merely provide background information related to the present disclosure and may not constitute prior art.

Diesel engines typically have higher efficiency than gasoline engines due to an increased compression ratio and a higher energy density of diesel fuel. A diesel combustion cycle produces particulates that are typically filtered from diesel exhaust by a particulate filter (PF) that is disposed in the exhaust stream. Over time, the PF becomes full and the trapped diesel particulates must be removed. During regeneration, the diesel particulates are burned within the PF.

Conventional regeneration methods inject fuel into the exhaust stream after the main combustion event. The post-combustion injected fuel is combusted over one or more catalysts placed in the exhaust stream. The heat released during the fuel combustion on the catalysts increases the exhaust temperature, which burns the trapped soot particles in the PF. This approach, however, can result in higher temperature excursions than desired, which can be detrimental to exhaust system components, including the PF.

SUMMARY

Accordingly, an exhaust system that processes exhaust generated by an engine is provided. The system generally includes a particulate filter (PF) that filters particulates from the exhaust wherein an upstream end of the PF receives exhaust from the engine. A grid of electrically resistive material is applied to an exterior upstream surface of the PF and selectively heats exhaust passing through the grid to initiate combustion of particulates within the PF. A catalyst coating applied to at least one of the PF and the grid. A control module estimates a temperature of the grid and controls the engine to produce a desired exhaust product to increase the temperature of the grid.

In other features, a method of regenerating a particulate filter (PF) of an exhaust system for an engine is provided. The method generally includes: applying a grid of electrically resistive material to a front exterior surface of the PF; applying a catalyst coating to at least one of the PF and the grid; estimating a temperature of the grid based on at least one of an exhaust composition and an exhaust temperature; and controlling the engine to produce a desired exhaust product to react with the catalyst coating to increase the estimated temperature of the grid.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 3:
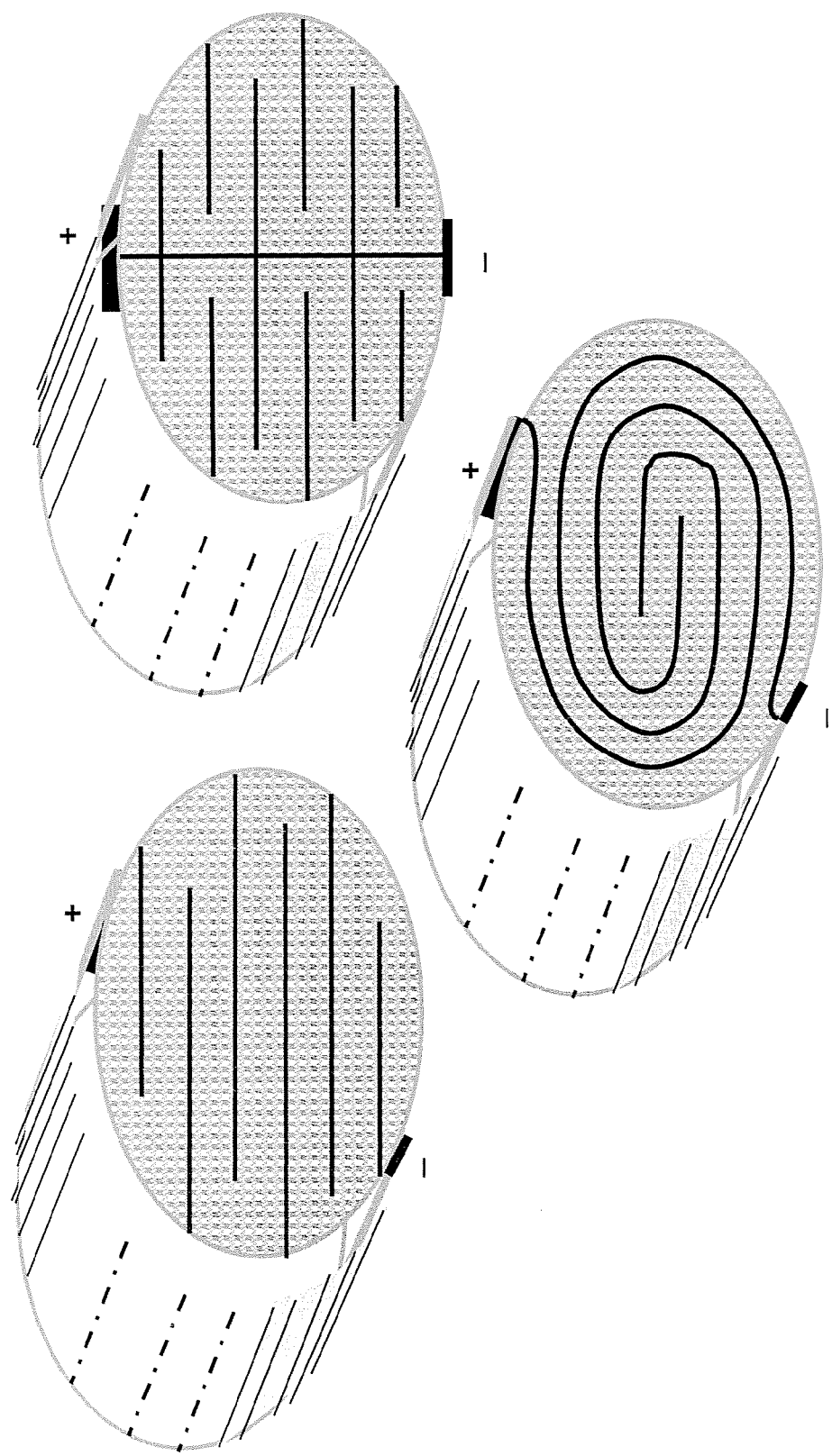

FIG. 3 includes perspective views of exemplary front faces of particulate filters illustrating various patterns of resistive paths.

Figure 4:
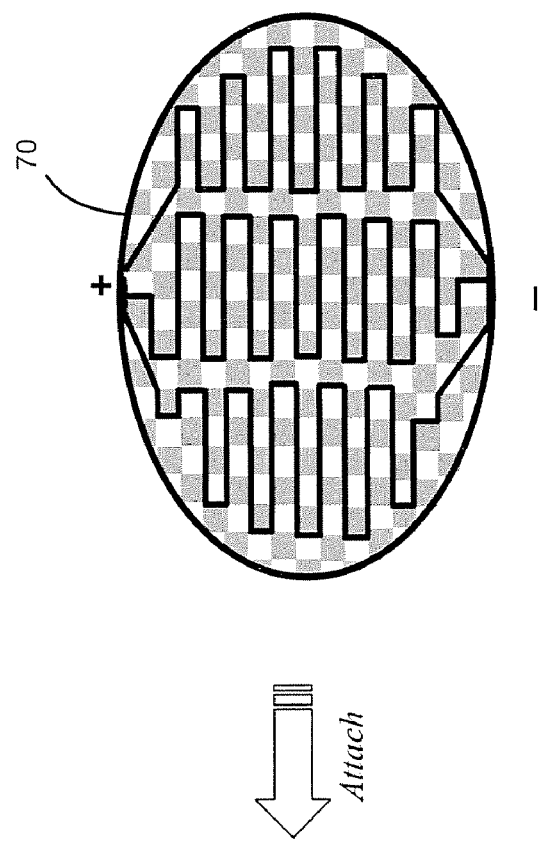
Figure 4:
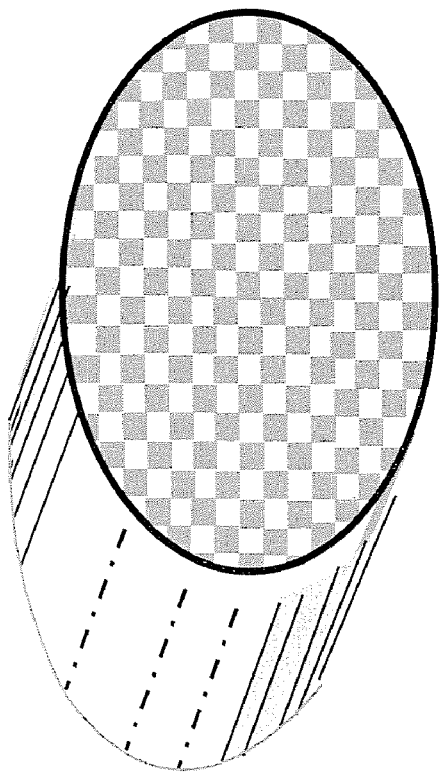

FIG. 4 is a perspective view of a front face of an exemplary particulate filter and a heater insert.

Figure 2:
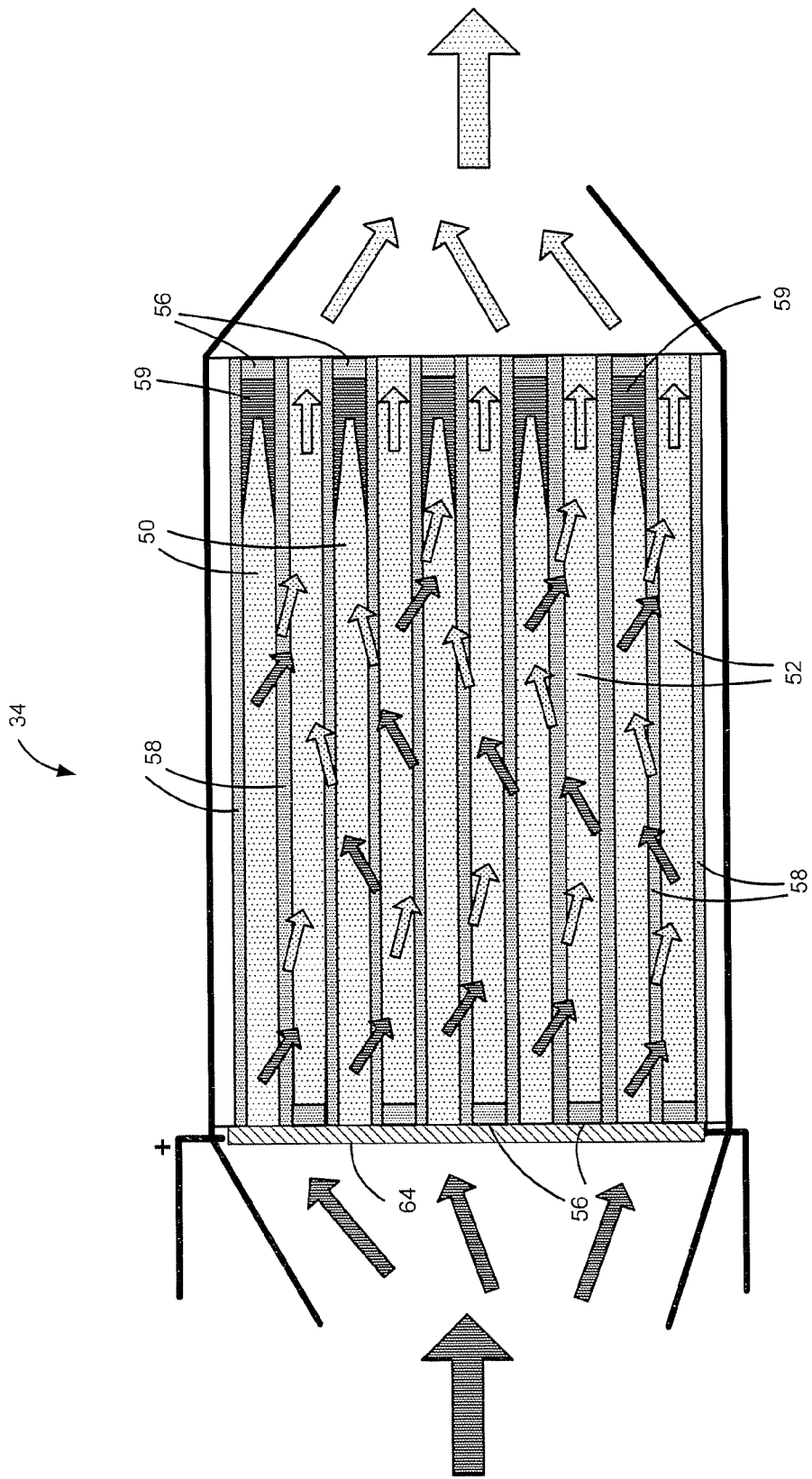
FIG. 2 is a cross-sectional view of an exemplary wall-flow monolith particulate filter.
Figure 5:
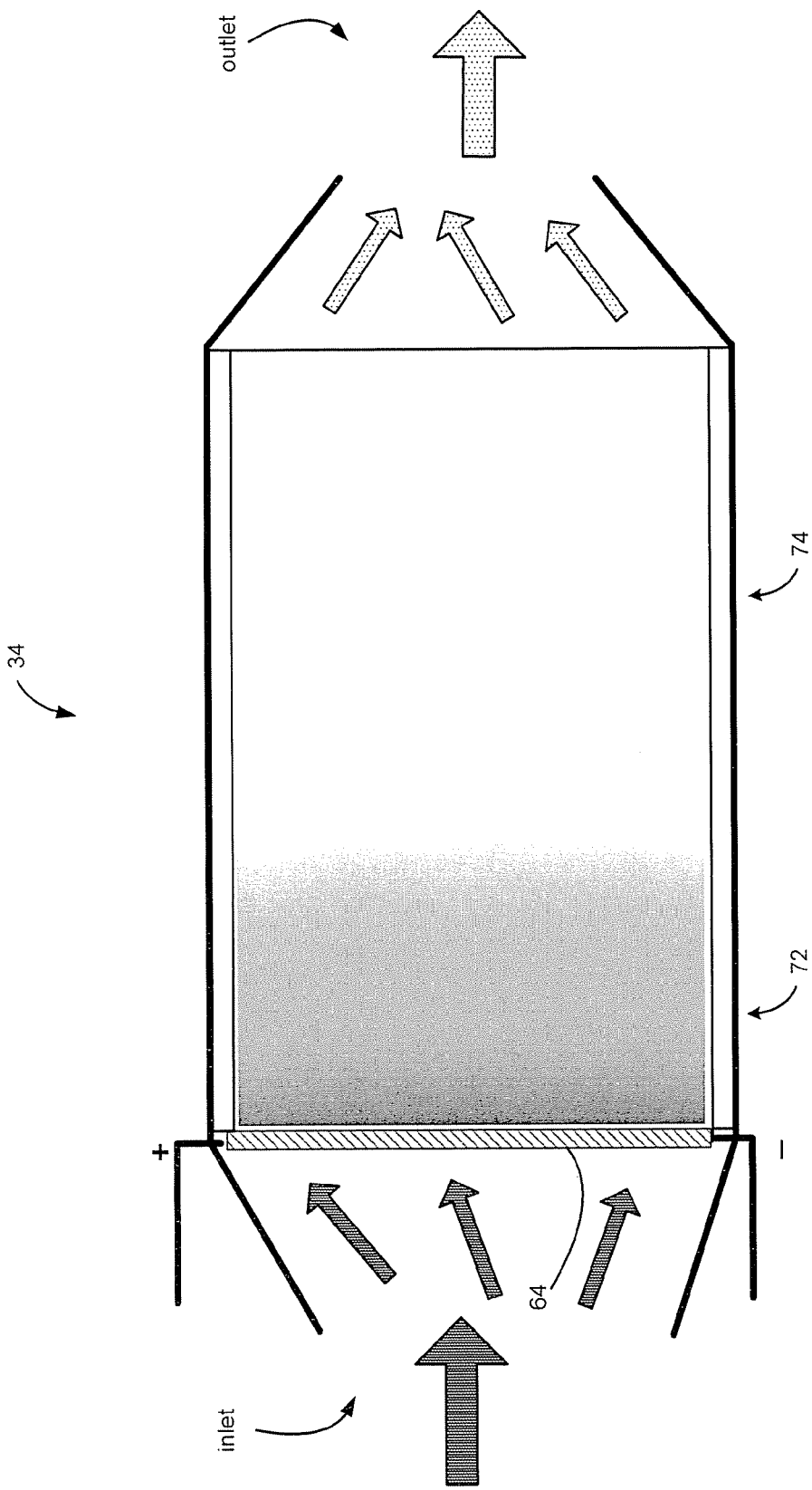

FIG. 5 is a cross-sectional view of the exemplary particulate filter of FIG. 2 including a catalyst coating according to various aspects of the present disclosure.

Figure 6:
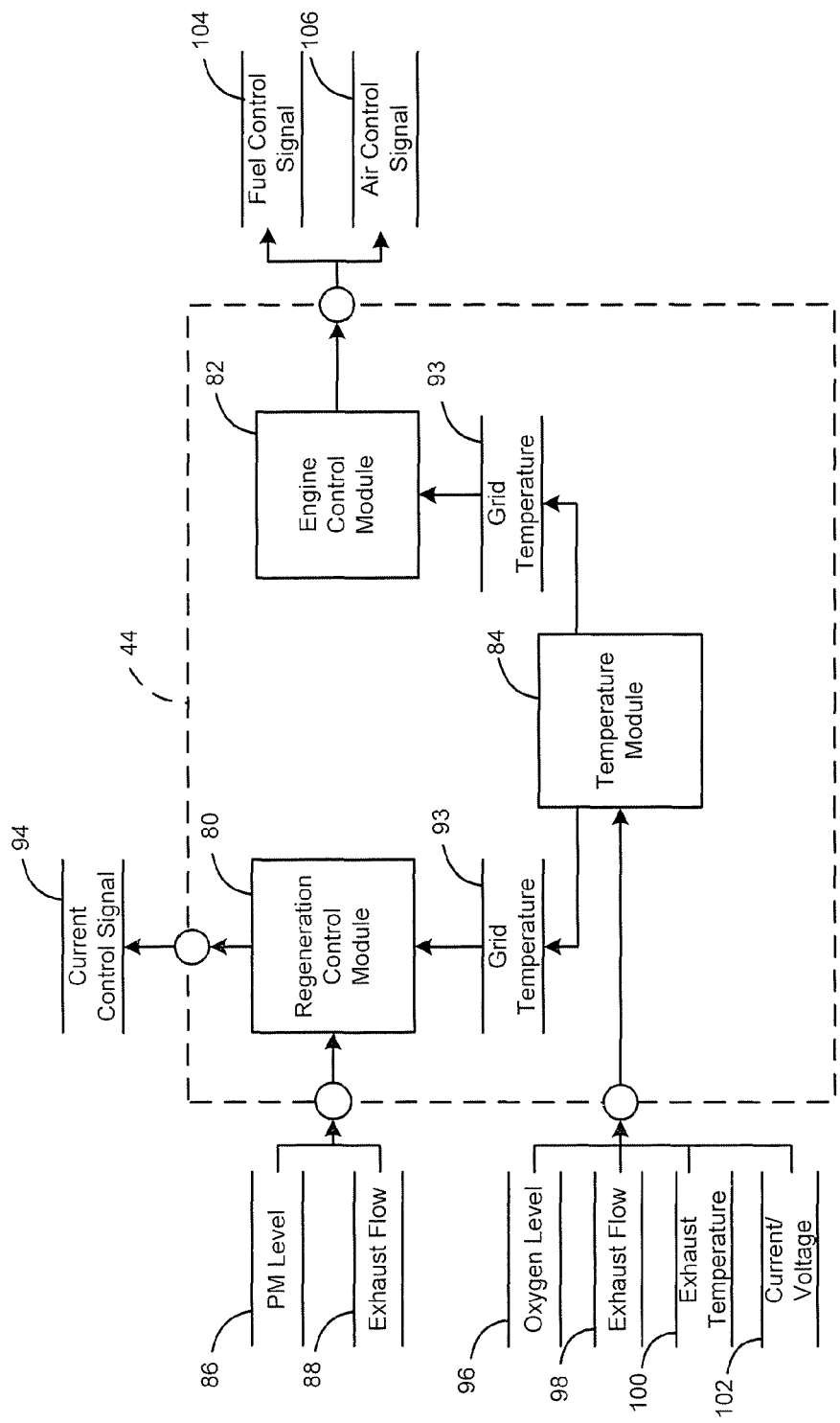

FIG. 6 is a dataflow diagram illustrating a particulate filter regeneration system according to various aspects of the present disclosure.

Figure 7:
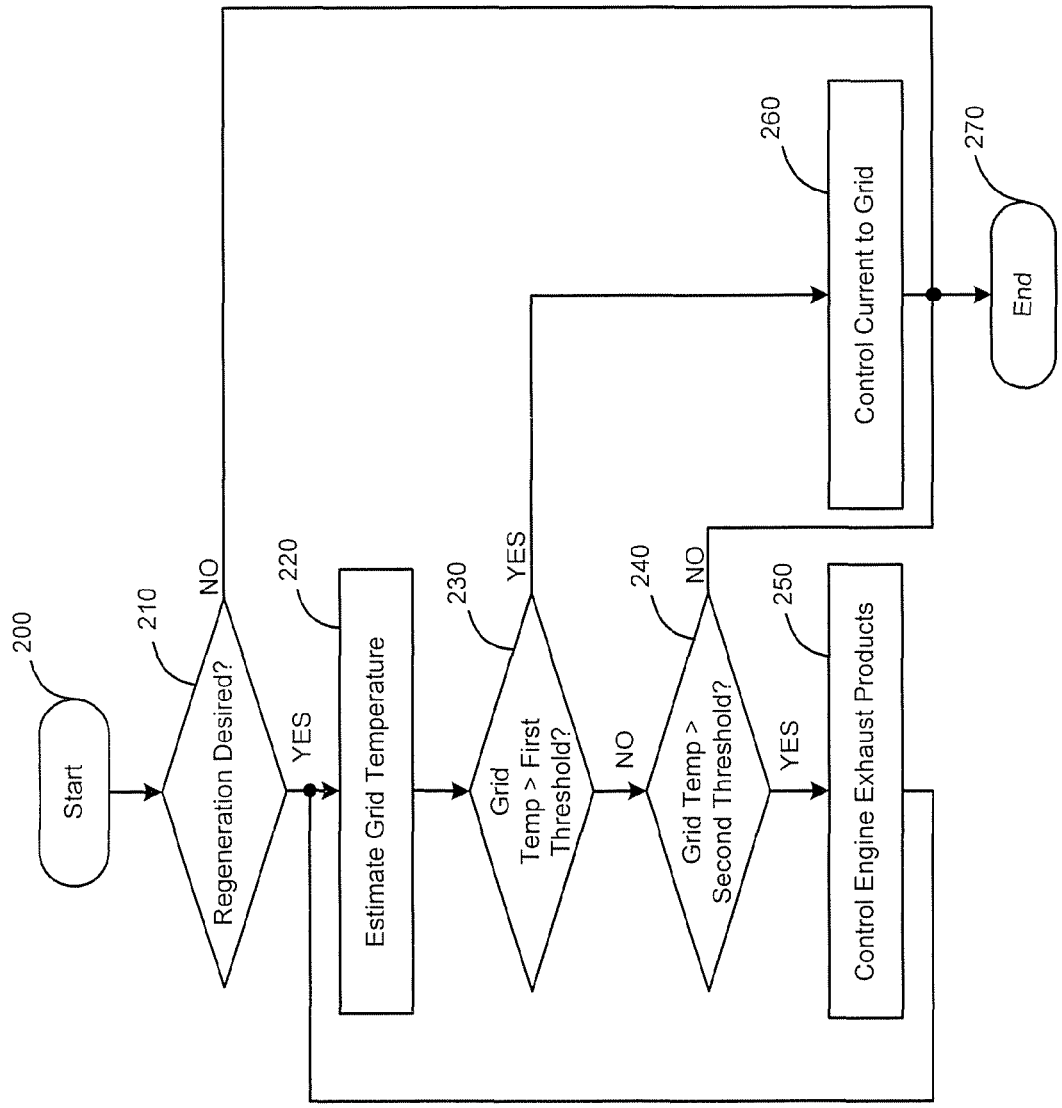

FIG. 7 is a flowchart illustrating a particulate filter regeneration method according to various aspects of the present disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
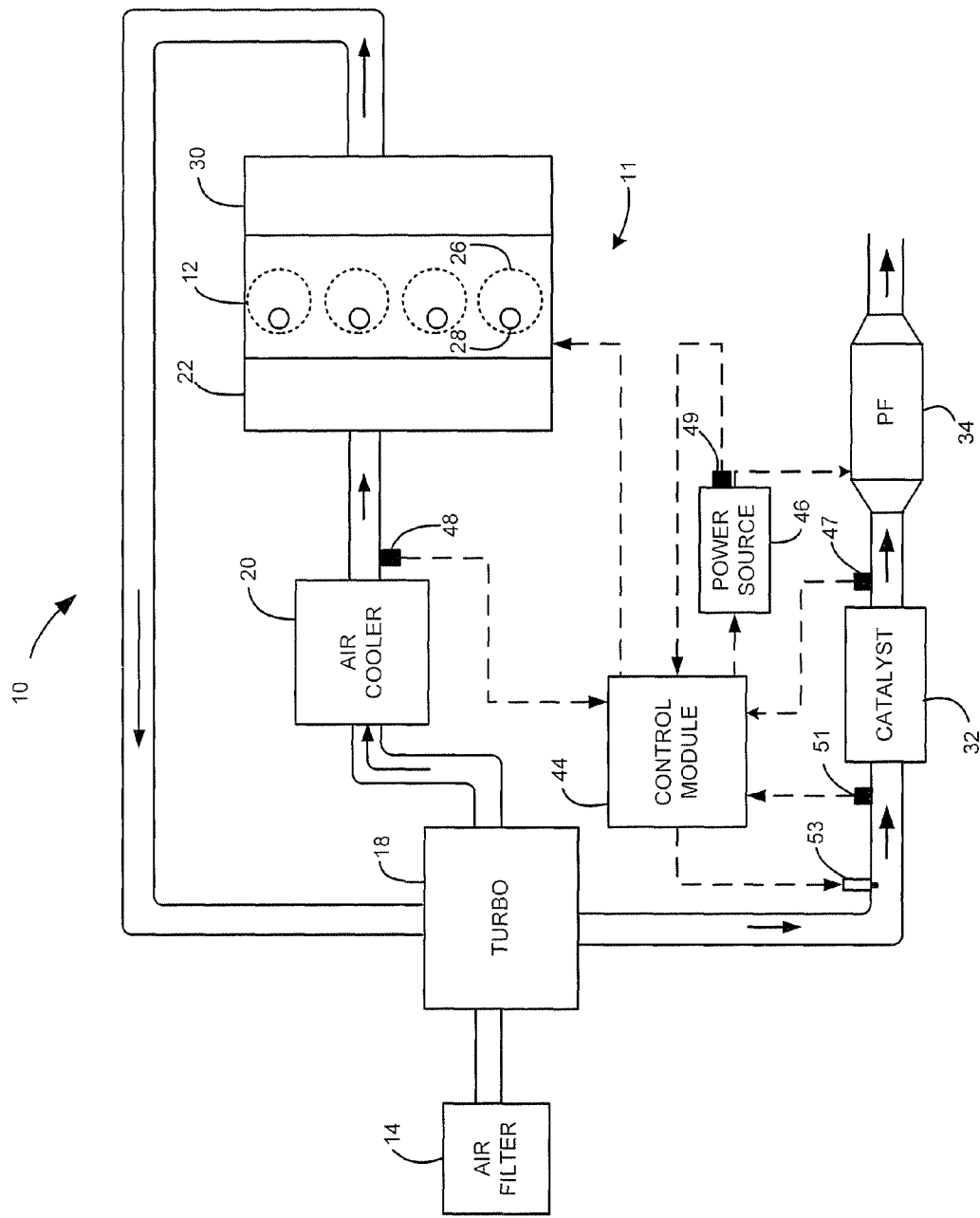
FIG. 1 is a functional block diagram of an exemplary vehicle including a particulate filter and a particulate filter regeneration system according to various aspects of the present disclosure.

Referring now to FIG. 1, an exemplary vehicle 10 including a diesel engine system 11 is illustrated in accordance with various aspects of the present disclosure. It is appreciated that the diesel engine system 11 is merely exemplary in nature and that the particulate filter regeneration system described herein can be implemented in various engine systems implementing a particulate filter. Such engine systems may include, but are not limited to, gasoline direct injection engine systems and homogeneous charge compression ignition engine systems. For ease of the discussion, the disclosure will be discussed in the context of a diesel engine system.

A turbocharged diesel engine system 11 includes an engine 12 that combusts an air and fuel mixture to produce drive torque. Air enters the system by passing through an air filter 14. Air passes through the air filter 14 and is drawn into a turbocharger 18. The turbocharger 18 compresses the fresh air entering the system 11. The greater the compression of the air generally, the greater the output of the engine 12. Compressed air then passes through an air cooler 20 before entering into an intake manifold 22.

Air within the intake manifold 22 is distributed into cylinders 26. Although four cylinders 26 are illustrated, it is appreciated that the systems and methods of the present disclosure can be implemented in engines having a plurality of cylinders including, but not limited to, 2, 3, 4, 5, 6, 8, 10 and 12 cylinders. It is also appreciated that the systems and methods of the present disclosure can be implemented in a v-type cylinder configuration. Fuel is injected into the cylinders 26 by fuel injectors 28. Heat from the compressed air ignites the air/fuel mixture. Combustion of the air/fuel mixture creates exhaust. Exhaust exits the cylinders 26 into the exhaust system.

The exhaust system includes an exhaust manifold 30, a diesel oxidation catalyst (catalyst) 32, and a particulate filter (PF) 34. Optionally, an EGR valve (not shown) re-circulates a portion of the exhaust back into the intake manifold 22. The remainder of the exhaust is directed into the turbocharger 18 to drive a turbine. The turbine facilitates the compression of the fresh air received from the air filter 14. Exhaust flows from the turbocharger 18 through the catalyst 32 and the PF 34. The catalyst 32 oxidizes the exhaust based on the post combustion air/fuel ratio. The PF 34 receives exhaust from the catalyst 32 and filters any particulate matter particulates present in the exhaust.

A control module 44 controls the engine 12 and PF regeneration based on various sensed and/or modeled information. More specifically, the control module 44 estimates particulate matter loading of the PF 34. When the estimated particulate matter loading achieves a threshold level (e.g., 5 grams/liter of particulate matter) and the exhaust flow rate is within a desired range, current is controlled to the PF 34 via a power source 46 to initiate the regeneration process. The duration of the regeneration process varies based upon the amount of particulate matter within the PF 34. It is anticipated, that the regeneration process can last between 1-6 minutes. Current is only applied, however, during an initial portion of the regeneration process. More specifically, the electric energy heats the face of the PF 34 for a threshold period (e.g., 1-2 minutes). Exhaust passing through the front face is heated. The remainder of the regeneration process is achieved using the heat generated by combustion of the particulate matter present near the heated face of the PF 34 or by the heated exhaust passing through the PF 34.

In some cases, high levels of exhaust flow from the engine 12 prevent the face from reaching a sufficient temperature. To allow the face to properly heat, the PF 34 includes a catalyst coating as will be discussed further below. In general, the control module 44 controls the engine 12 to produce exhaust products that include increased Hydrocarbons (HC) and Carbon Monoxide (CO). The HC and CO react with the catalyst coating of the PF 34 causing an increase in the temperature near the face of the PF 34.

The control module 44 controls the engine exhaust products based on sensor signals and/or modeled data and the particulate filter regeneration methods and systems of the present disclosure. In various embodiments, an exhaust temperature sensor 47 generates an exhaust temperature signal based on a temperature of the exhaust. A mass airflow sensor 48 generates an exhaust air signal based on air entering or exiting the engine 12. A current and/or voltage sensor 49 generates a current and/or voltage signal based on the voltage and/or current supplied by the power source 46 to the PF 34. An oxygen sensor 51 generates an oxygen level signal based on a level of oxygen in the exhaust.

In various embodiments, the control module 44 receives the signals and controls the engine 12 by, for example, commanding fuel to be injected in the exhaust after the combustion cycle via, for example, the fuel injector 28 or a post fuel injector 53 that injects fuel into the exhaust. In various other embodiments, the control module 44 controls the engine by controlling the air flow or valve timing.

With particular reference to FIG. 2, the PF 34 is preferably a monolith particulate trap and includes alternating closed cells/channels 50 and opened cells/channels 52. The cells/channels 50, 52 are typically square cross-sections, running axially through the part. Walls 58 of the PF 34 are preferably comprised of a porous ceramic honeycomb wall of cordierite material. It is appreciated that any ceramic comb material is considered within the scope of the present disclosure. Adjacent channels are alternatively plugged at each end as shown at 56. This forces the diesel aerosol through the porous substrate walls which act as a mechanical filter. Particulate matter is deposited within the closed channels 50 and exhaust exits through the opened channels 52. Particulate matter 59 flow into the PF 34 and are trapped therein.

For regeneration purposes, a grid 64 including an electrically resistive material is attached to the front exterior surface referred to as the front face of the PF 34. Current is supplied to the resistive material to generate thermal energy. It is appreciated that thick film heating technology may be used to attach the grid 64 to the PF 34. For example, a heating material such as Silver or Nichrome may be coated then etched or applied with a mask to the front face of the PF 34. In various other embodiments, the grid 64 is composed of electrically resistive material such as stainless steel and attached to the PF 34 using an adhesive or press fit to the PF 34.

It is also appreciated that the resistive material may be applied in various single or multi-path patterns as shown in FIG. 3. Segments of resistive material can be removed to generate the pathways. In various embodiments a perforated heater insert 70 as shown in FIG. 4 may be attached to the front face of the PF 34. In any of the above mentioned embodiments, exhaust passing through the PF 34 carries thermal energy generated at the front face of the PF 34 a short distance down the channels 50, 52. The increased thermal energy ignites the particulate matter present near the inlet of the PF 34. The heat generated from the combustion of the particulates is then directed through the PF 34 to induce combustion of the remaining particulates within the PF 34.

With particular reference to FIG. 5, in various embodiments a catalyst coating is additionally applied to the PF 34 or the grid 64. According to the present disclosure, the catalyst coating can be distributed in sub-sections of the PF 34 at varying densities optimized by an operating temperature of the PF 34. As can be appreciated, the density of the catalyst coatings can be applied in a step-like format or a continuous or linear format.

As shown in FIG. 5, an exemplary PF 34 includes an inlet that allows the exhaust to enter the PF 34 and an outlet that allows the exhaust to exit the PF 34. The PF 34 includes a first sub-section 72 and a second sub-section 74. The first sub-section 72 is located a first distance from the inlet. The second sub-section 74 is located a second distance from the inlet that is greater than the first distance. The first sub-section 72 is coated with catalysts at a first density. The first coating can include an oxidation catalyst that reduces HC and CO. The oxidation catalyst includes, but is not limited to, palladium, platinum, and/or the like. The second sub-section 74 can be coated with catalysts at a second density or alternatively, not coated at all. If coated, the second density is less than the first density. The second coating can also include an oxidation catalyst that reduces HC and CO, as discussed above.

With particular reference to FIG. 6, a dataflow diagram illustrates various embodiments of a particulate filter regeneration system that may be embedded within the control module 44. Various embodiments of particulate filter regeneration systems according to the present disclosure may include any number of sub-modules embedded within the control module 44. As can be appreciated, the sub-modules shown in FIG. 6 may be combined and/or further partitioned to similarly control regeneration of the PF 34. Inputs to the system may be sensed from the vehicle 10 (FIG. 1), received from other control modules (not shown) within the vehicle 10 (FIG. 1), and/or determined by other sub-modules (not shown) within the control module 44. In various embodiments, the control module 44 of FIG. 6 includes a regeneration control module 80, an engine control module 82, and a temperature module 84.

The regeneration control module 80 receives as input a particulate matter level 86 indicating an estimated level of accumulated particulate matter present in the PF 34 (FIG. 1) and an exhaust flow 88. Based on the particulate matter level 86 and the exhaust flow 88, the regeneration control module 80 determines whether regeneration is desired. For example, if the accumulated particulate matter level 86 is high and the exhaust flow 88 is sufficient to carry the combustion, the regeneration control module 80 determines that regeneration is desired.

The regeneration control module 80 can also receive as input a grid temperature 93 (as will be discussed below). Once regeneration is desired and the grid temperature 93 is within a predetermined range, the regeneration control module 80 generates a current control signal 94 that controls current to the PF 34 (FIG. 1) to heat the face of the PF 34 (FIG. 1).

The temperature module 84 receives as input an oxygen level 96, an exhaust flow 98, an exhaust temperature 100, and a current/voltage 102. The temperature module 84 predicts the grid temperature 93 of the grid 64 (FIG. 2) based on one or more of the inputs 96-102. In general, the temperature module 84 predicts the grid temperature 93 based on a composition of the engine exhaust as well as the exhaust temperature 100.

In various embodiments, the temperature module 84 can estimate the grid temperature 93 based on whether the catalyst 32 (FIG. 1) is provided. For example, when the catalyst 32 (FIG. 1) is provided, the grid temperature 93 is estimated as a function of a particulate filter exotherm, exhaust flow 98, a particulate filter temperature, and/or combinations thereof. The particulate filter exotherm can be estimated as a function of engine exhaust products, the oxygen level 96, catalyst efficiency, and/or combinations thereof. The engine exhaust products can be estimated based on a combustion strategy (e.g., fuel to air ratio, and/or valve timing). The particulate filter temperature can be estimated as a function of exhaust temperature 100 and/or catalyst exotherm. In various other embodiments, the temperature module 84 can estimate the grid temperature 93 based on the current/voltage value 102 and/or the exhaust flow 98.

The engine control module 82 receives as input the grid temperature 93. If the grid temperature 93 is outside of a predetermined desired range, the engine control module 82 can generate at least one of a fuel control signal 104 and an air control signal 106 to control the composition of the exhaust flowing to the PF 34 (FIG. 1). For example, the engine can be controlled to produce an increased level of HCs and/or CO in the exhaust so that a reaction may occur with the catalyst coating to increase the grid temperature 93. In various embodiments, the engine control module 82 controls the engine 12 (FIG. 1) based on whether a catalyst 32 (FIG. 1) is present.

With particular reference to FIG. 7, a flowchart illustrates an exemplary particulate filter regeneration method that can be performed by the particulate filter regeneration system of FIG. 6 in accordance with various aspects of the present disclosure. As can be appreciated, the order of execution of the steps of the exemplary particulate filter regeneration method can vary without altering the spirit of the method. The exemplary particulate filter regeneration method may be performed periodically during control module operation or scheduled to run based on certain events.

In one example, the method may begin at 200. The PF 34 (FIG. 1) is evaluated to determine if regeneration is desired at 210. If the PF 34 (FIG. 1) is full and regeneration is desired at 210, the grid temperature 93 is estimated as discussed above at 220 and evaluated at 230 and 240. Otherwise, if regeneration is not desired at 210, the method may end at 270.

At 230, if the grid temperature 93 is below a predetermined optimal temperature threshold (first threshold) and the grid temperature 93 is above a catalytic combustion temperature threshold (second threshold) at 240, then the engine 12 (FIG. 1) is controlled to produce a desired exhaust product at 250. Once the grid temperature 93 is above the predetermined optimal temperature threshold at 230, current is controlled to the grid 64 (FIG. 2) at 260. The method may end at 270. However, if the grid temperature 93 falls below the catalytic combustion temperature threshold at 240, the method may end at 270.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. An exhaust system that processes exhaust generated by an engine, comprising:
    a particulate filter (PF) that filters particulates from the exhaust wherein an upstream end of the PF receives exhaust from the engine;
    a grid of electrically resistive material that is applied to an exterior upstream surface of the PF and that selectively heats exhaust passing through the grid to initiate combustion of particulates within the PF;
    a catalyst coating applied to at least one of the PF and the grid;
    a control module that estimates a temperature of the grid and that controls the engine to produce a desired exhaust product to increase the temperature of the grid; and
    a catalyst disposed upstream from the grid,
    wherein the control module estimates the temperature of the grid based on the presence of the catalyst upstream from the grid.

2. The exhaust system of claim 1 wherein the control module estimates the temperature of the grid based on at least one of a composition of the exhaust and an exhaust temperature.

3. The exhaust system of claim 1 wherein the control module estimates the temperature of the grid based on at least one of a particulate filter exotherm, a particulate filter temperature, and an exhaust flow.

4. The exhaust system of claim 3 wherein the control module estimates the particulate filter temperature based on an exhaust temperature and a catalyst exotherm.

5. The exhaust system of claim 3 wherein the control module estimates the particulate filter exotherm based on at least one of a composition of the exhaust and an efficiency of the catalyst.

6. The exhaust system of claim 1 wherein the control module controls current to the grid to be during an initial period of a PF regeneration cycle.

7. The exhaust system of claim 6 wherein the control module estimates an amount of particulates within the PF and wherein the current is controlled when the amount exceeds a threshold amount.

8. A method of regenerating a particulate filter (PF) of an exhaust system for an engine, comprising:
- applying a grid of electrically resistive material to a front exterior surface of the PF;
- applying a catalyst coating to at least one of the PF and the grid;
- providing a catalyst upstream from the grid;
- estimating a temperature of the grid based on the presence of the catalyst upstream from the grid and at least one of an exhaust composition and an exhaust temperature; and
- controlling the engine to produce a desired exhaust product to react with the catalyst coating to increase the estimated temperature of the grid.

9. The method of claim 8 wherein the estimating the temperature of the grid is based on the composition of the exhaust and the exhaust temperature.

10. The method of claim 8 wherein the estimating the temperature of the grid is based on at least one of a particulate filter exotherm, a particulate filter temperature, and an exhaust flow.

11. The method of claim 10 further comprising estimating the particulate filter temperature based on an exhaust temperature and a catalyst exotherm.

12. The method of claim 10 further comprising estimating the particulate filter exotherm based on at least one of a composition of the exhaust and an efficiency of the catalyst.

13. The method of claim 8 further comprising heating the grid by supplying current to the electrically resistive material.

14. The method of claim 13 wherein the heating the grid is performed once the estimated temperature is above a predetermined threshold.

15. The method of claim 13 further comprising inducing combustion of particulates present on the front surface of the PF via the heated grid.

16. The method of claim 15 further comprising directing heat generated by combustion of the particulates into the PF to induce combustion of particulates within the PF.

17. The method of claim 13 further comprising controlling the current to initiate regeneration during an initial period of a PF regeneration cycle.

18. The method of claim 17 further comprising estimating an amount of particulates within the PF and wherein the controlling is performed when the amount exceeds a threshold amount.

* * * * *